United States Patent [19]

Okada

[11] 4,399,887

[45] Aug. 23, 1983

[54] COLLISION SENSING SYSTEM FOR VEHICLES AND ASSOCIATED METHOD

[75] Inventor: Motohiro Okada, Asaka, Japan

[73] Assignee: Honda Giken Kogyo Kabushiki Kaisha, Tokyo, Japan

[21] Appl. No.: 215,320

[22] Filed: Dec. 11, 1980

[30] Foreign Application Priority Data

Dec. 20, 1979 [JP] Japan ............................... 54-166186
Dec. 20, 1979 [JP] Japan ............................... 54-166187

[51] Int. Cl.³ .......................................... B60R 19/06
[52] U.S. Cl. ............................. 180/282; 200/61.45 M; 280/735
[58] Field of Search ................ 180/274, 282; 280/734, 280/735; 200/61.45 M; 293/132, 133, 134, 4

[56] References Cited

U.S. PATENT DOCUMENTS

| | | | |
|---|---|---|---|
| 2,997,557 | 8/1961 | Gillmor et al. | 200/61.45 M |
| 3,718,332 | 2/1973 | Jones | 293/4 X |
| 3,744,588 | 7/1973 | Nave, Sr. | 293/4 X |
| 3,860,258 | 1/1975 | Feustel et al. | 293/133 X |
| 3,887,223 | 6/1975 | Bez | 293/133 |
| 3,908,781 | 9/1975 | Oishi et al. | 280/735 X |
| 4,014,565 | 3/1977 | Fieni | 180/274 X |
| 4,166,641 | 9/1979 | Okada et al. | 180/282 X |

FOREIGN PATENT DOCUMENTS 2213323 9/1972 Fed. Rep. of Germany ...... 293/133

Primary Examiner—Joseph F. Peters, Jr.
Assistant Examiner—Michael Mar
Attorney, Agent, or Firm—Posnack, Roberts, Cohen & Spiecens

[57] ABSTRACT

A method and apparatus for operating a seat-occupant restraining device in response to collision of a vehicle, comprising a front bumper on the vehicle adapted for receiving impact in the course of a collision and supported by a damper which opposes rearward displacement of the bumper. The damping is a function of the change of velocity of the vehicle during the collision and is used to displace a normally stationary part of the damper when the collision force exceeds a predetermined value. The displacement of the stationary part of the damper serves to close a switch to actuate the seat-occupant restraining device. The switch can be an acceleration detection switch in which case the stationary part is supported by the vehicle body by a deformable structure or the switch can be made as a deformable unit which undergoes deformation by the application of force thereto from the stationary part of the damper.

19 Claims, 9 Drawing Figures

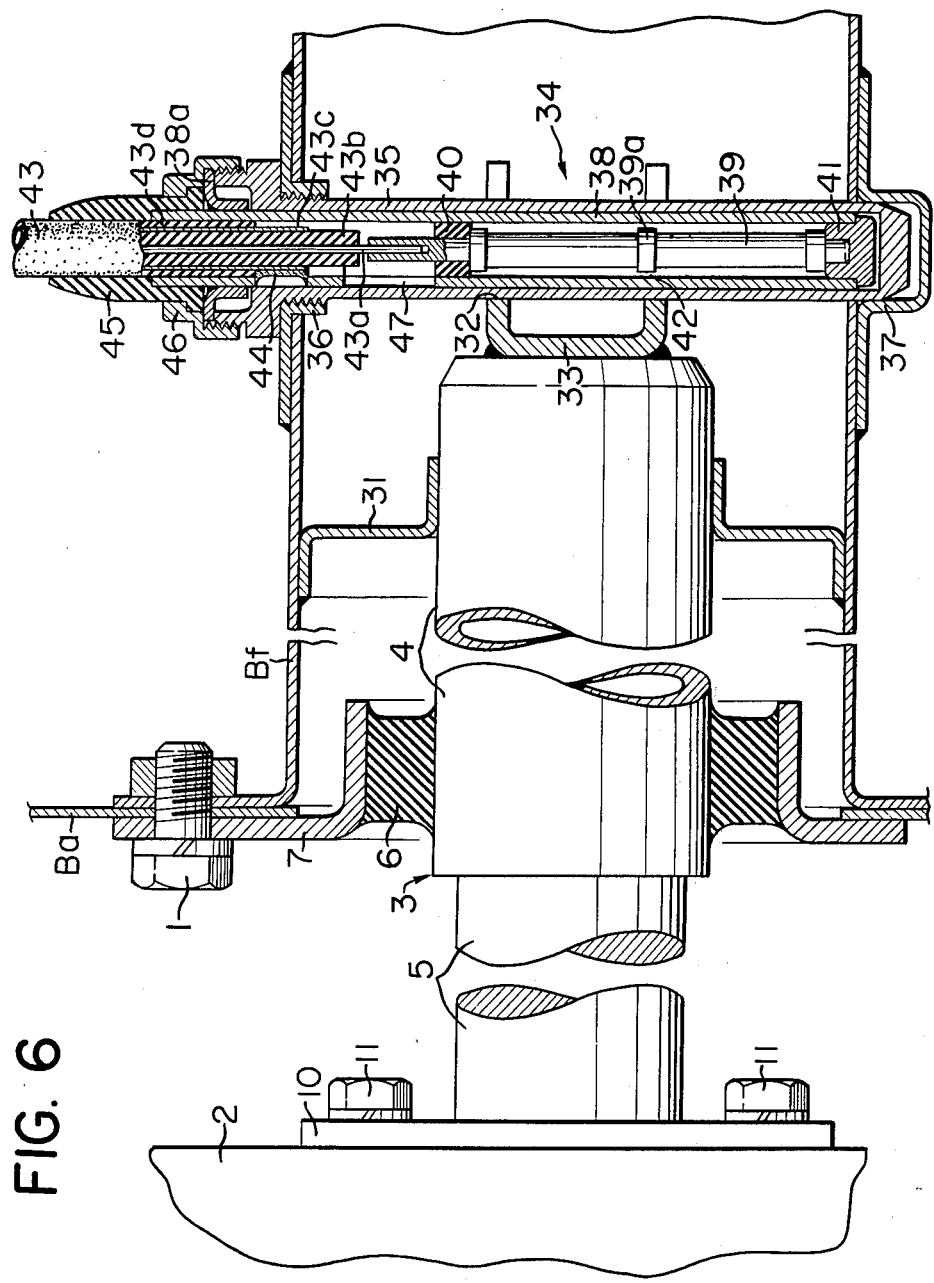

COLLISION SENSING SYSTEM FOR VEHICLES AND ASSOCIATED METHOD

FIELD OF THE INVENTION

The present invention relates to a collision sensing system and associated method adapted for initiating the operation of a seat-occupant restraining device, such as an air bag for restraining the movement of a body in the seat due to inertia, upon detection of the collision of an automobile or like vehicle.

PRIOR ART

Collision sensors proposed hitherto have a g sensor mounted in the compartment or cabin of the vehicle or attached to the front bumper or other front part of the automobile. The g sensor mounted in the cabin, although suitable for exactly judging whether the restraining operation is to be made, takes a non-negligible time to become operative after a collision load is actually imposed on the front part of the vehicle, so that a time lag is produced in effecting the restraint of the seat occupant. On the other hand, although a g sensor attached to the front part of the vehicle can sense collision without delay, it may erroneously operate upon sensing collision with a small object which would not cause substantial impact to the seat occupant in the cabin, particularly during high-speed travel.

Another collision sensing system hitherto proposed incorporates a hydraulic damper through which the front bumper is attached to the chassis so that the collison is detected by increase of the pressure of the fluid in the damper. This type of collision sensing system, however, is also subject to erroneous operation upon detection of collision with a small object. In addition, this type of sensor becomes inoperative when there is a leak of fluid in the damper.

SUMMARY OF THE INVENTION

It is an object of the invention to provide a novel collision sensing system and associated method for automobiles or like vehicles capable of overcoming the problems associated with the prior art apparatus.

To this end, according to the invention, there is provided a collision sensing system for a vehicle comprising a chassis and a seat-occupant restraining device mounted in a cabin on the chassis, the collision sensing system comprising a collision load bearing portion provided outside the chassis; damper means having a movable part and a stationary part, the movable part being connected to the collision load bearing portion and the stationary part being connected to the chassis through an impact absorbing member; and acceleration sensing switch means on the stationary part of the damper for actuating the seat-occupant restraining device upon sensing a magnitude of deceleration in excess of a predetermined value of deceleration.

The above and other objects, as well as advantageous features of the invention will become clear from the following description of preferred embodiments taken in conjunction with the accompanying drawings.

BRIEF DESCRIPTION OF THE DRAWINGS

FIG. 6 is a sectional view similar to that of FIG. 3 but showing the collision sensing system in accordance with a second embodiment of the invention.

DESCRIPTION OF THE PREFERRED EMBODIMENTS

Figure 1:
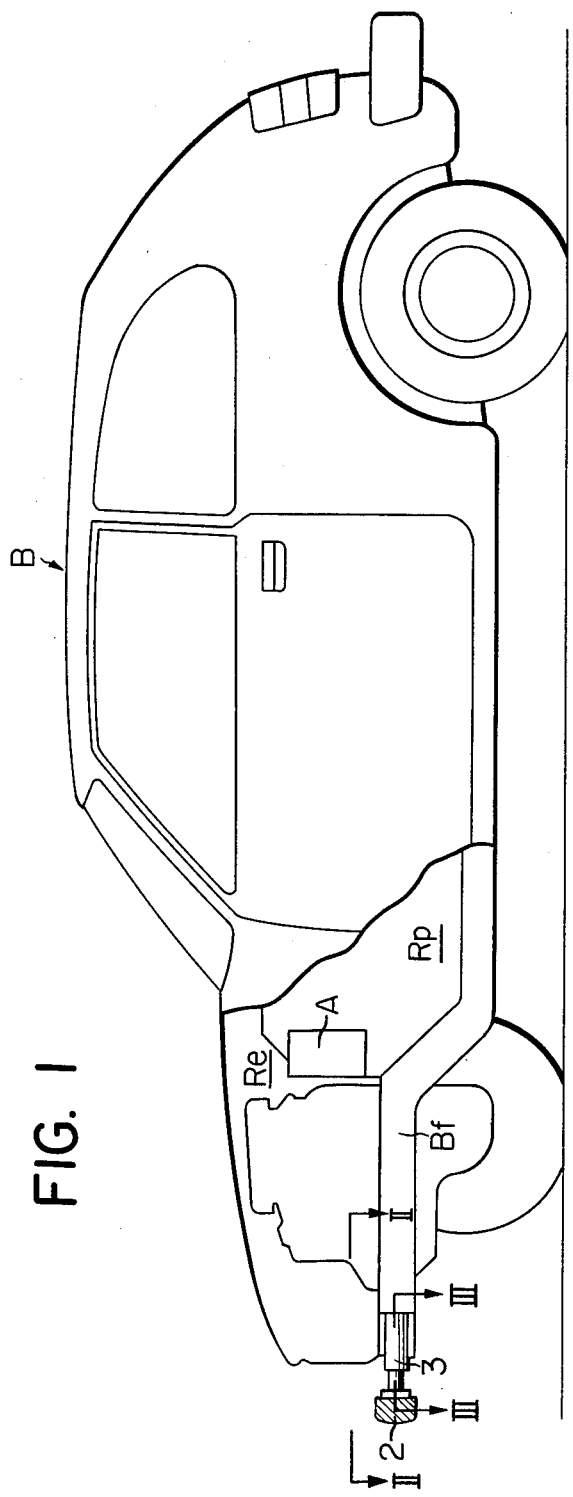
FIG. 1 is a side elevational sectional view of an automobile incorporating a collision sensing system of a first embodiment of the invention.
Figure 2:
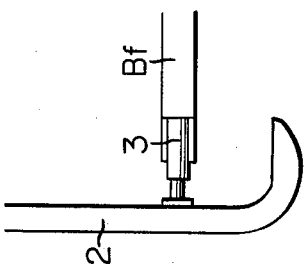
FIG. 2 is a sectional view taken along line II—II in FIG. 1.

Referring first to FIGS. 1 to 5 showing a first embodiment of the invention, therein is seen a body B of an automobile having a cabin or passenger compartment Rp and an engine compartment Re in front of the passenger compartment Rp. An air bag or similar seat-occupant restraining device A is mounted in the passenger compartment Rp.

The body B is provided at the bottom thereof with a pair of hollow frames Bf extending longitudinally, only the left frame being visible in the drawing. Each frame is connected at its front end to a front wall Ba by bolts 1. A front bumper 2 at the front of the body B is attached to the front ends of the frames Bf through a hydraulic damper 3. The front bumper 2 constitutes the collision load bearing portion of the invention.

Figure 3:
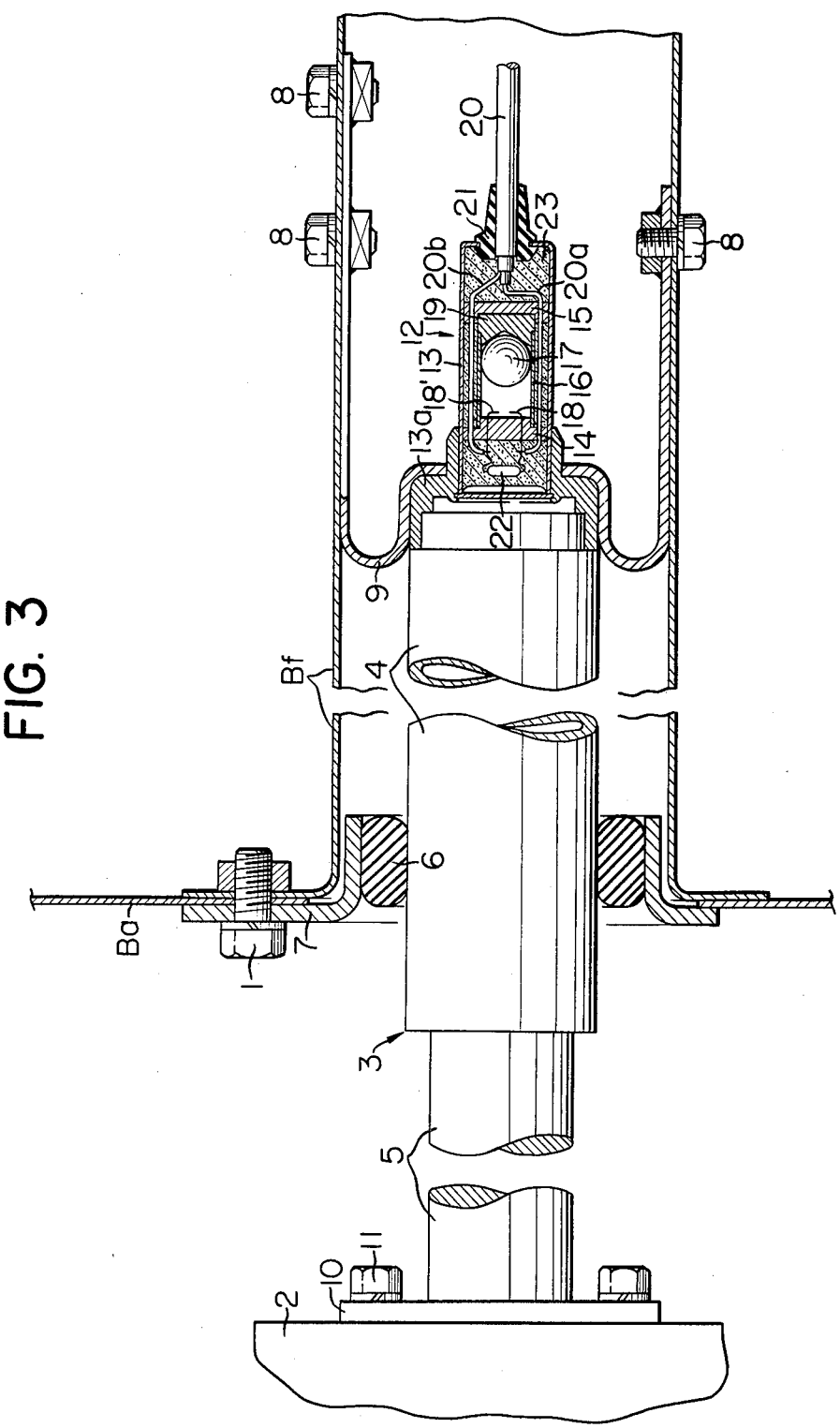
FIG. 3 is an enlarged sectional view taken along line III—III in FIG. 1.

As will be clearly seen from FIG. 3, the damper 3 includes a normally stationary cylinder 4 and a movable piston 5 (in telescopic relation with cylinder 4) adapted to slide in the cylinder while producing a damping effect. The stationary cylinder 4 is disposed in the hollow frame Bf with its front end slidably carried by a rubber bushing 6 on a bracket 7 which, in turn, is fixed by bolt 1 to the frame Bf, while the rear end of the cylinder 4 is connected to the free end of an impact absorbing member 9 which is fixed at its fixed end to the frame Bf by bolts 8. The movable piston 5 is connected to the front bumper 2 by an end plate 10 and bolts 11.

In the collision sensing system having the described construction, the front bumper 2 has a strength greater than that of the impact absorbing member 9 and sufficient to sustain, without substantial deformation, such a collision as would not require the operation of the seat-occupant restraining device A. The upper limit of the change of velocity of such a collision is usually about 16 Km/h. This speed will be referred to simply as $\Delta V_1$ hereinafter. The damper 3 is so adjusted as to increase the damping effect when a change of velocity of the vehicle which would require the operation of the seat-occupant restraining device A (the lower limit of this velocity change is about 20 Km/h and will be referred to simply as $\Delta V_2$ hereinafter) due to a collision with a flat stationary barrier, particularly when the vehicle velocity is changed between $\Delta V_1$ and $\Delta V_2$.

An acceleration sensing switch 12, adapted to operate in response to a rearward acceleration exceeding a predetermined value, is provided on the stationary cylinder 4 of the damper 3. The construction of this switch will be described hereafter with specific reference to FIG. 3.

The acceleration sensing switch 12 comprises an elongated cylindrical housing 13 which extends in the longitudinal direction of the body B. An attaching plate 13a formed at the front end of the housing 13 is clamped between the stationary cylinder 4 and the impact energy absorbing member 9 when these two members are connected to each other. A pair of supporting plates 14, 15 fitted in the housing 13 support a guide cylinder 16 coaxially in the housing 13. The guide cylinder 16 accomodates a spherical weight 17 plated with gold for constituting an electrical contact. The front supporting plate 14 is provided with a pair of contacts 18, 18' for cooperating with the weight 17, while the rear supporting plate 15 is provided with a permanent magnet 19. The weight 17 is usually attracted by the permanent magnet 19 away from the contacts 18, 18', as shown in FIG. 3.

An electrical cable 20 connected to the seat-occupant restraining device A extends into the housing 13 through an insulating grommet 21 at the rear end of the housing. The cable 20 has a central conductor 20a and an outer conductor 20b which are connected to the contacts 18 and 18', respectively. A resistance 22 for a monitor circuit is connected between the contacts 18, 18'. After completion of the electric connections, the space in the housing 13 is filled with a moisture-proof resin 23.

Figure 5:
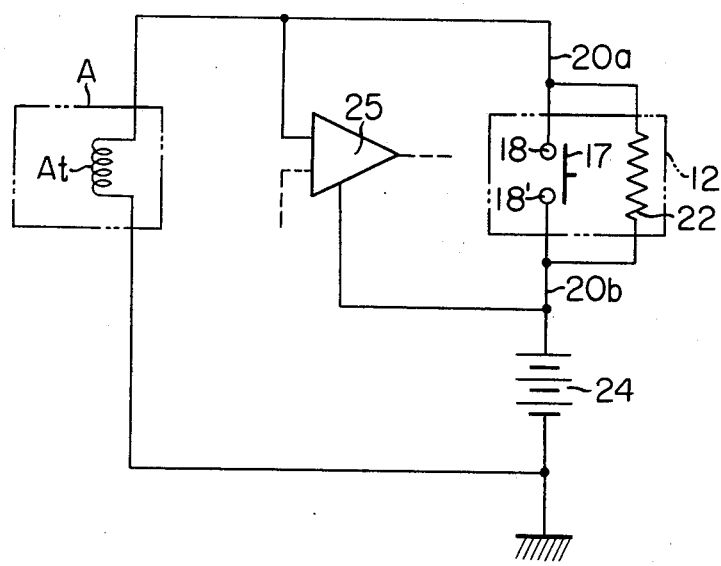
FIG. 5 is an electrical wiring diagram of the acceleration sensing switch.
Figure 7:
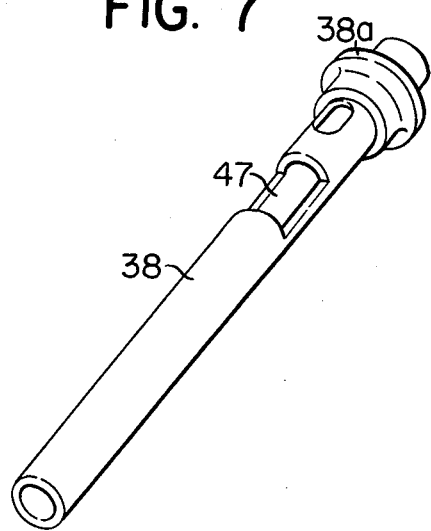
FIG. 7 is a perspective view of a switch cylinder incorporated in the embodiment shown in FIG. 6.

Referring now to FIG. 5 showing the circuit diagram of the acceleration sensing switch 12, an actuator At for actuating the seat-occupant restraining device A is connected to a power source 24. The conductor 20a connected to the contact 18 is connected to the actuator At, while the conductor 20b connected to the other contact 18' is connected to the power source 24. Reference numeral 25 designates an input amplifier of a circuit for checking the operation of the actuator At and is adapted to monitor a weak current which flows between the contacts 18, 18' through the resistance 22.

Figure 4:
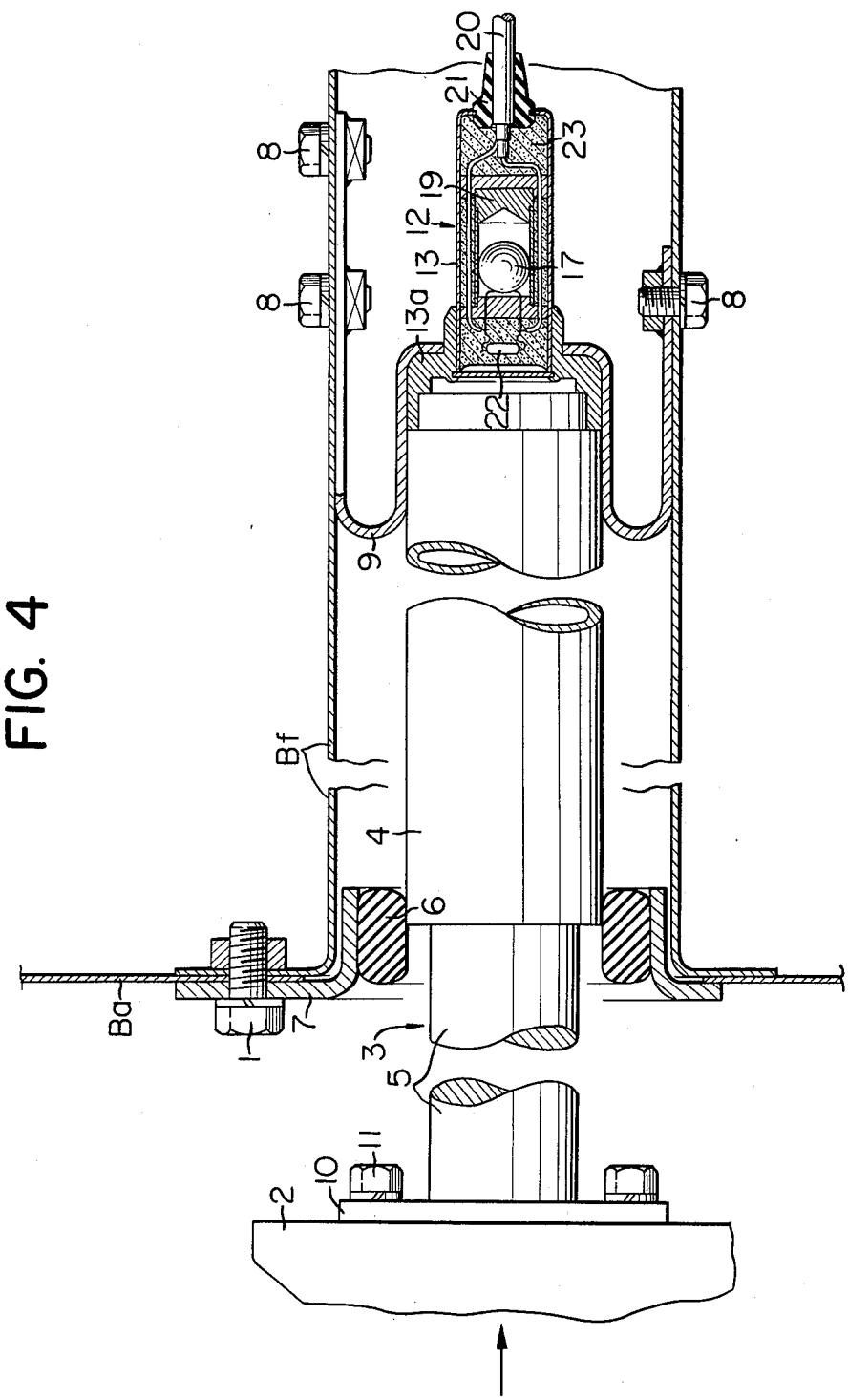
FIG. 4 is a view similar to FIG. 3 and showing the operation state of the acceleration sensing switch.

In operation, when a moving automobile is involved in a collision which causes a change of velocity exceeding $\Delta V_2$, the front bumper 2 is moved rearwardly upon impact at the time of the collision, so that the movable piston 5 of the damper 3 is forced into the stationary cylinder 4 to produce a damping force acting against the rearward movement of the front bumper 2, while the load imposed on the stationary cylinder 4 is resisted by the impact energy absorbing member 9. Therefore, as the damping force exceeds a predetermined value, the stationary cylinder 4 is moved rearwardly together with the acceleration sensing switch 12, while imparting a deformation to the impact energy absorbing member 9. If the rearward acceleration exceeds a predetermined value, the weight 17 of the switch 12 is released from the magnet 19 and rolls forwardly into contact with the contacts 18, 18' as shown in FIG. 4. Then, the acceleration sensing switch 12 is closed so that the actuator At is energized by the supply of electric current to actuate the seat-occupant restraining device A to restrain, without delay, the movement of the seat-occupant due to inertia.

Since the damper 13 is of hydraulic type, it is possible to obtain a damper force which is a function of the velocity of rearward movement of the front bumper 2 and more particularly is proportional to the square of the velocity thereof. When the collision takes place with a velocity change below $\Delta V_1$, the energy of collision is all absorbed by the rearward movment of the movable piston 5. For a greater velocity change, the damping effect produced by the damper 3 is abruptly increased so that the movable piston 5 is moved rearwardly as a unit with the stationary cylinder 4 to operate the acceleration sensing switch 12 without time delay. This operation has been confirmed by experiments and also by simulation calculations. Effectively, when the pressure in the damper exceeds a predetermined value, the cylinder 4 is displaced rearwardly and serves as an actuator for operating the switch 12.

A high pressure is produced instantaneously in the damper 3 when the automobile comes into contact with a small object during high-speed travel. In this case, however, the collision impact is so small that the impact energy absorbing member 9 does not undergo substantial deformation and easily absorbs the energy thereby avoiding the danger of erroneous operation of the acceleration sensing switch 12.

In the event that there is a leakage of oil in the damper 3, the damper 3 is displaced right away without resistance load due to the large collision load, although the sensible limit may be slightly shifted to the low-speed side. Thereafter, the stationary cylinder 4 is moved rearwardly in the same manner as that when there is no leakage of oil, to actuate the acceleration detecting switch 12. In the period until the damper 3 is fully displaced, no deceleration takes place in the passenger compartment Rp so that no forward movement of the seat-occupant takes place. In other words, the effect of collision of the seat-occupant is initiated at a time when the full displacement of the damper is completed. The time period from this instant to the initiation of operation of the acceleration sensing switch 12 is substantially the same as that required when there is no leakage of oil in the damper. Thus, the collision sensing system operates even when there is leakage of oil in the damper.

FIGS. 6 to 9 show a collision sensing system in accordance with a second embodiment of the invention, in which the same reference numerals are used to denote the same parts or members as those of the first embodiment.

The body B is provided at its bottom with a pair of frames Bf extending in the longitudinal direction at each side of the body as in FIG. 1 and in the cavity of the frame Bf, the stationary cylinder 4 is coupled to the frame Bf at its front end through rubber bushing 6, bracket 7 and bolts 1, while the rear end of the stationary cylinder 4 is slidably carried by a bracket 31 fixedly mounted on the frame Bf. A contact member 33 having a rearwardly open notch 32 is fixed to the stationary cylinder 4. The front bumper 2 is fixed to the movable piston 5 by end plate 10 and bolts 11.

As in the embodiment of FIGS. 1–5, the front bumper 2 has a strength which can sustain, without substantial deformation, a collision with a velocity change below an upper limit $\Delta V_1$ (usually 16 Km/h or so) as would not require the operation of the seat-occupant restraining device A. The damper 3 is adjusted to increase the damping effect when the automobile undergoes collision with a stationary flat barrier with a velocity change below a lower limit $\Delta V_2$ at which the seat-occupant restraining device A should operate (usually, this lower limit is about 20 Km/h). The damping effect should be increased particularly in a collision which causes a velocity change between $\Delta V_1$ and $\Delta V_2$.

A load sensing switch 34 for delivering an operation signal to the seat-occupant restraining device A is provided behind the damper 3. The construction of this switch will be described hereafter with specific reference to FIGS. 6 and 7.

The switch 34 comprises an outer switch cylinder 35 which extends vertically through the frame Bf and is supported at both its ends by supporting members 36, 37 which are fixed to the upper and lower surfaces of the frame Bf. The outer cylinder 35 has an intermediate portion contacted by the contact member 33 on the stationary cylinder 4. An inner switch cylinder 38 is fitted in the outer cylinder 35 and supports an electrode rod 39 by respective bushings 40 and 41, the bushing 40 being electrically insulative while bushing 41 constitutes an electrical resistance. The electrode rod 39 has a central annular ridge 39a normally forming a gap 42 with the inner surface of the inner cylinder 38. The inner and outer cylinders 38, 35 constitute a switch cylinder, while the inner cylinder 38 and the electrode rod constitute a switch contact.

Cable 43 connected to the seat-occupant restraining device A is inserted into the inner cylinder 38 and conductor 43a of the cable 32 is connected to the upper end of the electrode rod 39. The cable 43 has a multi-layered construction constituted by the central conductor 43a, insulating tube 43b covering the conductor 43a, a network shield grounding line 43c around the insulating tube 43b and an insulating tube 43b surrounding the grounding line 43c. The grounding line 43c is connected electrically to the inner cylinder 38 through a solder connection 44.

The inner cylinder 38 is provided with an attachment flange 38a adapted for engagement with the upper end of the outer cylinder 35. The flange 38a is secured to a seal sleeve 45 closely fitted over the cable 43 and the inner cylinder 38 by means of a ring nut 46 which is screwed onto an upper threaded end of the outer cylinder 35.

In the load sensing switch 34, the outer cylinder 35, together with its internal members such as inner cylinder 38 and electrode rod 39 constitute a unit whose total bending strength is greater than the damping force produced by the damper 3 in response to the velocity change $\Delta V_1$ but less than the damping force produced in response to the velocity change $\Delta V_2$.

In FIG. 6, reference numeral 47 designates an access window formed in the inner cylinder 38 to enable the formation of a sealed connection between the electrode rod 39 and the conductor 43a. After the completion of the connection, the window is closed, preferably by filling with a sealing resin. In order to ensure the proper functioning of the switch constituted by the inner cylinder 38 and the electrode rod 39, it is effective to plate the inner surface of the inner cylinder 38 and the outer peripheral surface of the electrode rod 39 with gold, and to fill the space in the inner cylinder 38 with an inert gas.

Figure 8:
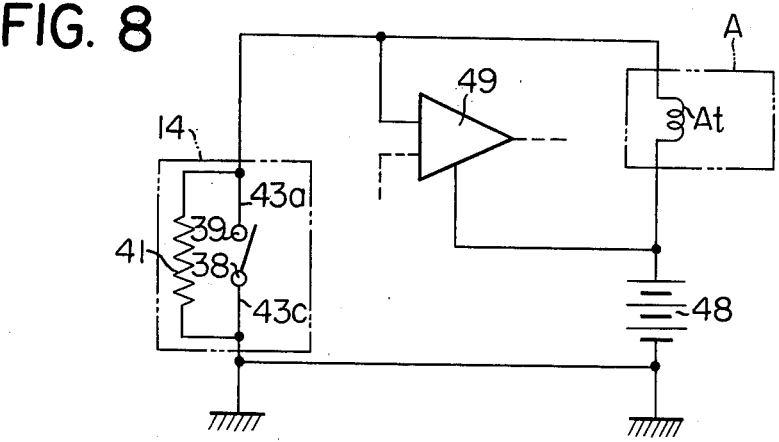
FIG. 8 is an electrical diagram of a load sensing switch.

Referring to FIG. 8 showing the circuit diagram of the load sensing switch 34, an actuator At such as a detonator for actuating the seat-occupant restraining device A is connected to a power surface 48. The conductor 43a connected to the electrode rod 39 is also connected to the actuator At, while the ground line 43c connected to the inner cylinder 38 is connected to the ground side of the power source 48. Reference numeral 49 designates an input amplifier for checking the operation of the actuator At and is adapted to monitor a weak electric current flowing through the resistance bushing 41 which electrically interconnects the inner cylinder 38 and the electrode rod 39.

Figure 9:
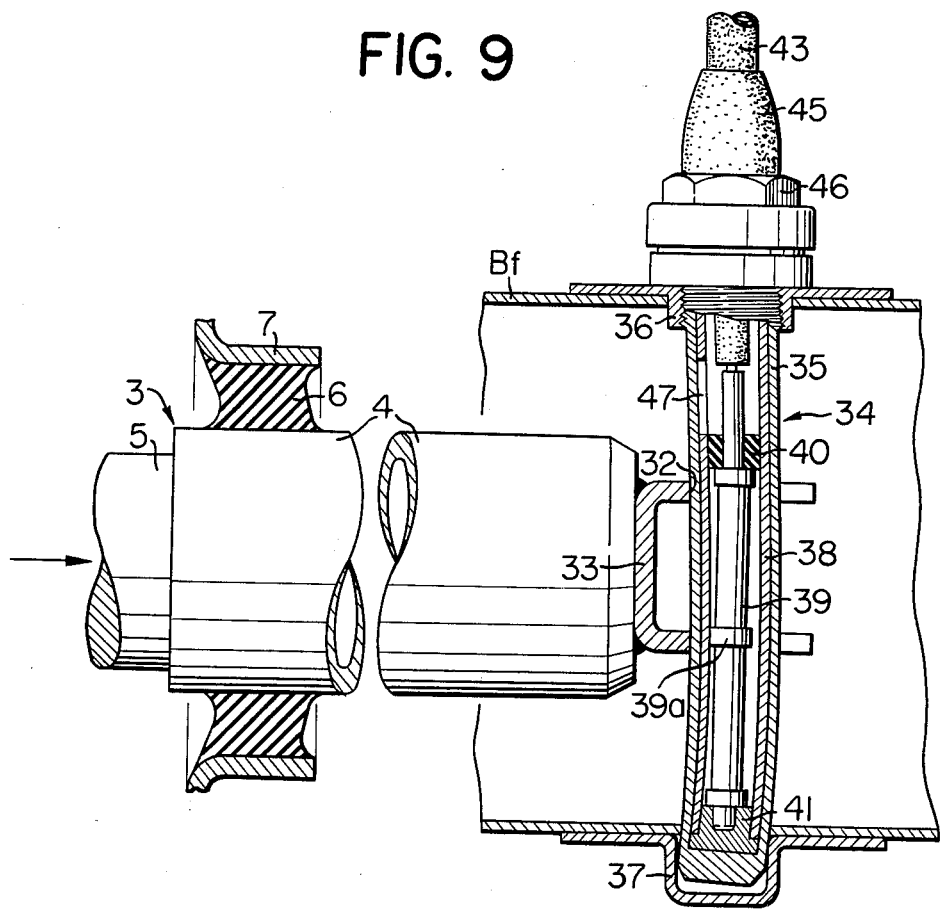
FIG. 9 is a view similar to FIG. 6 showing the operation of the load sensing switch.

In operation, if the automobile undergoes a collision which causes a velocity change exceeding $\Delta V_2$, the front bumper 2 is moved rearwardly at the time of impact with the collision load, while the damper 3 permits its movable piston 5 to move rearwardly to generate the damping effect to resist the rearward movement of the front bumper 2. In consequence, the stationary cylinder 4, serving as an actuator for the switch 34, is moved rearwardly causing deformation of the rubber bushing 6, so that the outer cylinder 35 of the switch 34, as well as its internal cylinder 38 and rod 39, is deformed as shown in FIG. 9 thereby to cause the annular ridge 39a of the electrode rod 39 to contact the inner surface of the inner cylinder 38. Thus, the load sensing switch 34 is closed to energize the actuator At by a supply of electric current, so that the seat-occupant restraining device A is put into operation to restrain the movement of the seat-occupant due to inertia.

Since the damper 3 is of hydraulic type, it is possible to obtain a damping force which is related to the velocity of rearward movement of the front bumper 2, i.e. is proportional to the square of the velocity, so that the damping force is sufficiently changed in response to a velocity change of between $\Delta V_1$ and $\Delta V_2$. Therefore, in the event that the collision causes a velocity change in excess of $\Delta V_1$, a large load is imposed without delay on the load sensing switch 34, and when the velocity change further exceeds $\Delta V_2$, the switch is closed without fail.

Usually, the collision load produces strong vibrations but, in accordance with the invention, vibrations are absorbed by the damper 3, so that closure of the load sensing switch 34 is stabilized to ensure the safe functioning of the seat-occupant restraining device A.

As stated before, the front bumper 2 does not undergo substantial deformation in a collision which causes a velocity change below $\Delta V_1$, and the damper 3 produces the damping effect stably, so that erroneous operation of the load sensing switch 34 attributable to a local deformation of the front bumper 2 is avoided.

As has been described, according to the invention, there is provided a collision sensing system having the collision load bearing portion 2 provided at the front part of the vehicle body, the damper 3 including movable part 5 connected to the collision load bearing portion and stationary part 4 connected to the vehicle body through impact energy absorbing member 9, and an acceleration sensing switch 12 on the stationary part of the damper and adapted to trigger the operation of seat-occupant restraining device A upon sensing a rearward acceleration in excess of a predetermined value.

Therefore, the change in velocity due to collision is detected as the damping force produced by the damper and the amount of deformation of the impact energy absorbing member 9, and the acceleration sensing switch 12 operates when both of these detected values exceed a predetermined value, so that the seat-occupant restraining device is put into operation without delay to ensure the safety function of the device. In addition, the collision sensing system of this invention can operate, even in the case where there is trouble i.e. leakage in the damper, substantially in the same manner as it does when there is no trouble in the damage.

In addition, since the collision load bearing portion is mounted at the front end of the vehicle body through the damper, and since the load sensing switch, operable in response to a damping force of the damper in excess of a predetermined value, is provided between the damper and the vehicle body, the damper provides a collision load discriminating function to transmit only a collision load exceeding a predetermined value to safely and promptly operate the seat-occupant restraining device only when the latter is required to function. In addition, the damper provides an absorption effect to stabilize the operation of the load sensing switch. As a result, the seat-occupant restraining device can operate without fail when it is required to function, thereby to insure the safety of the seat-occupant.

Furthermore, in the embodiment of the collision load sensing type in which the front bumper is attached to the vehicle body for rearward movement and the load sensing switch 34 adapted to close by deformation of constituents thereof when a load exceeding a predetermined value is imparted through the front bumper, is interposed between the front bumper and the vehicle body, it is possible to detect the collision promptly and, by a suitable selection of factors such as attaching strength of the front bumper, strength of constituents of the load sensing switch and the like, a collision load which is smaller than the previously selected value is nullified to prevent the erroneous operation due to a small impact. Therefore, the seat-occupant restraining device operates without fail and promptly, only when it is required to function, thereby to further assure the safety of the seat-occupant.

What is claimed is:

1. A collision sensing system for a vehicle having a vehicle body; a seat-occupant restraining device in a passenger compartment of the vehicle and a collision load bearing portion mounted externally of said body; said collision sensing system comprising damper means including a movable part connected to said collision load bearing portion and a normally stationary part which is displaceable by a force exceeding a predetermined value, said movable part and said normally stationary part being in telescopic relation, an impact energy absorbing member connecting said stationary part to said body; and acceleration sensing switch means coupled to said normally stationary part of said damper means for actuating said seat-occupant restraining device in response to a rearward acceleration of said switch means in excess of a predetermined value, whereby said movable part and said normally stationary part are adapted to be moved in sequence.

2. A collision sensing system as claimed in claim 1 wherein said switch means comprises a movable switch closure member.

3. A collision sensing system as claimed in claim 1 wherein said collision load bearing portion comprises a front bumper at the front of said vehicle body.

4. A collision sensing system as claimed in claim 1 wherein said damper means comprises a hydraulic piston and cylinder unit.

5. A collision sensing system as claimed in claim 1 wherein said impact energy absorbing member has a strength substantially less than said collision load bearing portion.

6. A collision sensing system as claimed in claim 1 wherein said switch means comprises a deformable switch closure member.

7. A collision sensing system as claimed in claim 6 wherein said switch means comprises a switch cylinder having opposite ends supported by said vehicle body and an electrode rod mounted in said switch cylinder with a normal predetermined gap between said rod and said switch cylinder, and means coupled to said bumper and acting on said switch cylinder intermediate the ends thereof for deforming said cylinder to bring the cylinder and electrode rod into contact with one another when the collision load exceeds said predetermined value.

8. A collision sensing system as claimed in claim 7 wherein said switch means has a deformation strength, to resist the force applied thereto by said bumper, which is substantially less than the strength of said bumper.

9. A collision sensing system as claimed in claim 1 wherein said switch means comprises a housing including means for securing the switch means to said stationary part upon attachment of said impact energy absorbing member to said stationary part.

10. A collision sensing system as claimed in claim 1 further comprising a circuit including said seat-occupant restraining device and said acceleration sensing switch means, the latter constituting the sole switching element in said circuit controlling actuation of said seat-occupant restraining device.

11. A collision sensing system for a vehicle having a vehicle body with a front end; a seat-occupant restraining device in a passenger compartment of the vehicle and a collision load bearing portion at the front end of said body; said collision sensing system comprising damper means connecting said load bearing portion to said front end of the body, said damper means including a movable part coupled to said load bearing portion to be displaced thereby when the load bearing portion is displaced by impact force in a collision and a normally stationary part in which said movable part is movable, said damper means being operative to couple the stationary part with the movable part when the movable part travels at a velocity exceeding a predetermined value whereby the stationary part tends to be displaced with the movable part, resisting means of limited strength opposing displacement of the stationary part to hold the stationary part substantially at rest until the stationary part is subjected to a force exceeding a predetermined value, and switch means coupled to said stationary part of said damper means for energizing said seat-occupant restraining device in response to displacement of said stationary part.

12. A collision sensing system as claimed in claim 11 wherein said switch means is responsive to acceleration of said stationary part.

13. A collision sensing system as claimed in claim 11 wherein said switch means comprises deformable switch members which are normally open and are subjected to force applied by the displaced stationary part to be closed by deformation of the switch members.

14. A collision sensing system as claimed in claim 11 further comprising a circuit including said seat-occupant restraining device and said switch means, the latter constituting the sole switching element in said circuit controlling actuation of said seat-occupant restraining device.

15. A method of operating a seat-occupant restraining device in response to collision of a vehicle, said method comprising sensing impact of a vehicle during collision by displacing a collision load bearing member rearwardly in response to said impact, damping the rearward travel of said collision bearing member by a damping assembly in which a movable member connected to the collision load bearing member for displacement therewith travels in a stationary member which itself is displaceable with respect to the body by deformation of an impact energy absorbing member, the damping being a function of the change of velocity of the vehicle during the collision, deforming said impact absorbing member when the change of velocity of the vehicle and thereby the damping exceeds a predetermined value, displacing an actuator connected to said stationary member by the effect of the travel of the stationary member when said damping exceeds said predetermined value, and actuating a seat-occupant restraining device by displacement of the actuator.

16. A method as claimed in claim 15 wherein the displacement of the actuator produces a closure of a switch which energizes a circuit for actuating the restraining device.

17. A method as claimed in claim 16 wherein the closure of the switch is effected when the acceleration of the actuator exceeds a predetermined value.

18. A method as claimed in claim 16 wherein the closure of the switch is effected when the actuator is displaced to apply a force to the switch exceeding a predetermined value.

19. A method as claimed in claim 18 wherein the switch is normally open and comprises deformable members, said actuator applying said force to the deformable members of the switch to deform said members and close the switch when the force exceeds said predetermined value.

* * * * *